United States Patent
Bellers et al.

(10) Patent No.: US 12,205,552 B2
(45) Date of Patent: Jan. 21, 2025

(54) LOCAL ADAPTIVE BACKLIGHT CONTROL

(71) Applicant: V-Silicon Semiconductor (Hefei) Co., Ltd, Hefei (CN)

(72) Inventors: Erwin Bellers, Fremont, CA (US); Johannes Gerardus Rijk van Mourik, Union City, CA (US)

(73) Assignee: V-Silicon Semiconductor (Hefei) Co., Ltd, Hefei (CN)

( * ) Notice: Subject to any disclaimer, the term of this patent is extended or adjusted under 35 U.S.C. 154(b) by 136 days.

(21) Appl. No.: 18/085,385

(22) Filed: Dec. 20, 2022

(65) Prior Publication Data

US 2024/0203369 A1    Jun. 20, 2024

(51) Int. Cl.
  *G09G 3/34*    (2006.01)
  *G02F 1/1335*    (2006.01)
  *G02F 1/13357*    (2006.01)

(52) U.S. Cl.
  CPC ..... *G09G 3/3426* (2013.01); *G02F 1/133603* (2013.01); *G02F 1/133601* (2021.01); *G09G 2310/0237* (2013.01); *G09G 2320/064* (2013.01); *G09G 2320/0646* (2013.01); *G09G 2360/16* (2013.01)

(58) Field of Classification Search
  CPC ........ G02F 1/133603; G02F 1/133601; G09G 2320/064; G09G 2320/0646; G09G 2360/16; G09G 3/3426; G09G 2310/0237
  See application file for complete search history.

(56) References Cited

U.S. PATENT DOCUMENTS

| | | | |
|---|---|---|---|
| 2010/0053222 A1* | 3/2010 | Kerofsky | G09G 3/3406 345/690 |
| 2011/0141002 A1* | 6/2011 | Kim | G09G 3/342 345/102 |
| 2018/0047345 A1* | 2/2018 | Dunn | G09G 3/3607 |
| 2022/0335907 A1* | 10/2022 | Shi | G09G 3/3426 |

\* cited by examiner

*Primary Examiner* — Douglas M Wilson
(74) *Attorney, Agent, or Firm* — Schwegman Lundberg & Woessner, P.A.

(57) ABSTRACT

A method of operating a backlight comprises: receiving an input video; analyzing characteristics of the input video within a plurality of predefined spatial windows having one or more light emitting diodes to generate required light levels; generating backlight drive levels per spatial window to reduce the backlight in a first set of the plurality of the predefined spatial windows; and driving the backlight according to the generated backlight drive levels.

14 Claims, 4 Drawing Sheets

LOCAL ADAPTIVE BACKLIGHT CONTROL

TECHNICAL FIELD

This application relates generally to display devices and more specifically, but not exclusively, to adjusting a backlight in a display device.

BACKGROUND

A backlight is a form of illumination used in displays. However, backlights consume a lot of energy if always on, especially for larger displays and contrast can be worse for always-on backlights.

BRIEF SUMMARY

A method of operating a backlight comprises: receiving an input video; analyzing characteristics of the input video within a plurality of predefined spatial windows having one or more light emitting diodes to generate required light levels; generating backlight drive levels per spatial window to reduce the backlight in a first set of the plurality of the predefined spatial windows; and driving the backlight according to the generated backlight drive levels.

A backlight system comprises an analyzer, a backlight driver levels block and circuitry. The analyzer is configured to receive input video and analyze characteristics of the input video within a plurality of predefined spatial windows having one or more light emitting diodes to generate required light levels. The backlight drive levels block is configured to generate backlight drive levels per spatial window to reduce the backlight in a first set of the plurality of the predefined spatial windows. The circuitry is configured to drive the backlight according to the generated backlight drive levels.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments include a display system in which a multiple zone backlight is dynamically controlled based on an input video signal and the backlight and the input video signal may be modified accordingly in such a way that:

The backlight is reduced in darker picture parts;
The backlight, if capable, is boosted for highlights or the very bright picture parts; and
The video signal is locally compensated for at least in the regions which receive a reduced amount of light.

Furthermore the system may comprise:
A video analyzer to analyze the characteristics of the source video;
A backlight calculation unit which adapts the backlight locally based on the analyzed characteristics as well as the backlight profile; and
A video compensation unit which compensate the video signal accordingly.

In addition, the backlight profile may be calculated based on a model which uses the backlight spatial resolution as input. Further, the video signal can be locally compensated with different amounts in R, G and B to compensate for color differences in a light profile.

Figure 1:
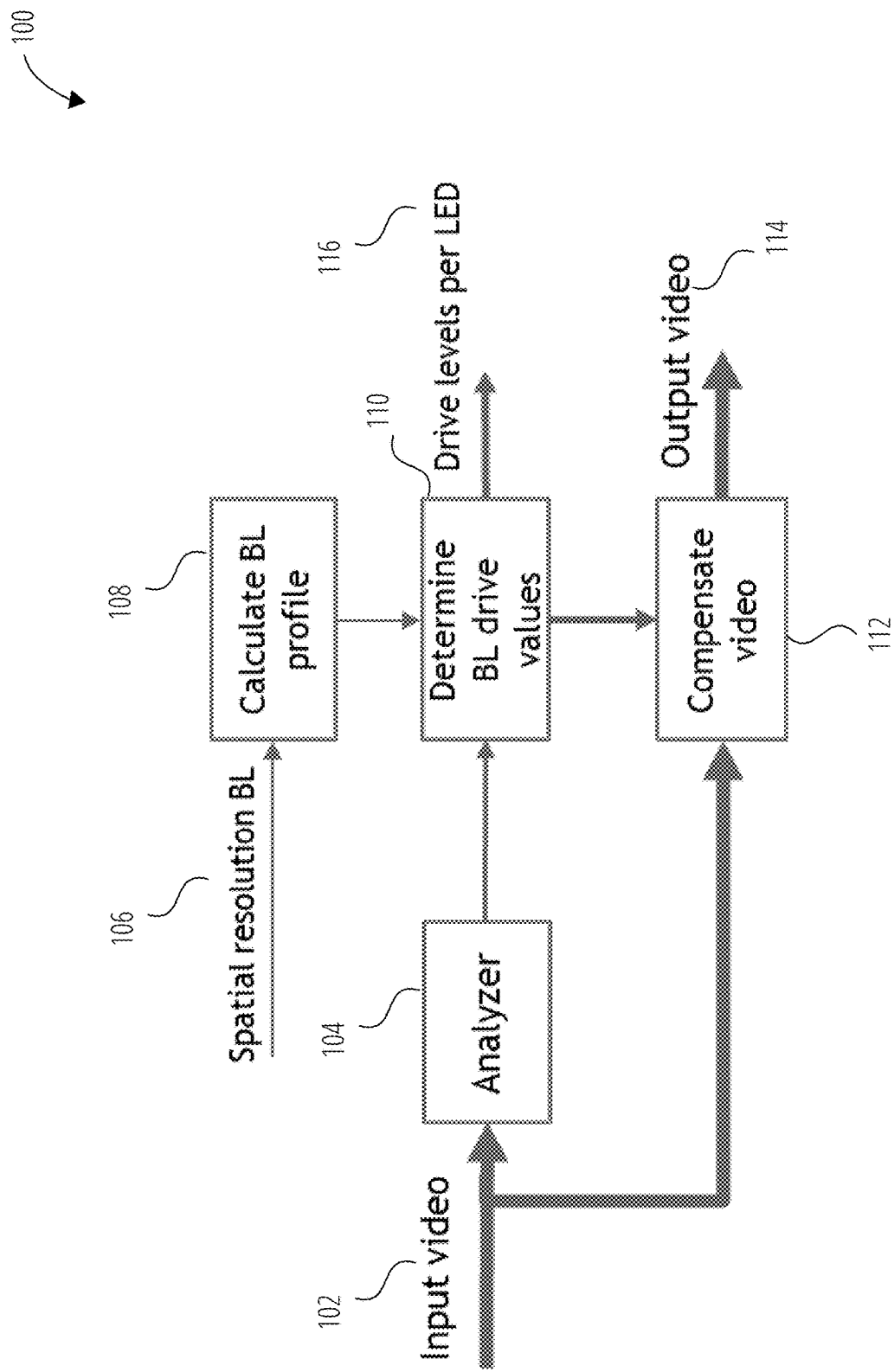
FIG. 1 illustrates a backlight system in accordance with one embodiment.

FIG. 1 illustrates a backlight system 100 in accordance with one embodiment. The backlight system 100 comprises an analyzer 104 that receives input video 102. Output of the analyzer 104 goes to a determine BL drive values 110 block, which outputs drive levels per LED or LED segment 116 (in case there are multiple LEDs that are driven equally within a segment). In addition, a compensate video 112 receives the input video 102 and outputs output video 114 based on the determined BL drive values from the determine BL drive values 110 block. In addition, a calculate BL profile 108 block uses a spatial resolution BL 106 to generate output to the determine BL drive values 110 block.

In the backlight system 100, the input video 102 is analyzed by the analyzer 104. The analysis is based on, but not limited to, the MAX of the R, G, and B within a predefined window in which the window dimension is related to the spatial resolution of the backlight grid. The analyzer 104 provides 'requested or required light levels' to the determine BL drive values 110 block which determines the desired drive levels for the backlight.

The backlight (BL) drive levels comprises pulse width modulation (PWM) values per LED or segment containing multiple LEDs and in case the BL is capable of boosting, additional current control values per LED or segment.

In order to determine the proper PWM and current values per LED, the light profile of the backlight (BL profile) is needed in addition to the required light levels. The profile is based on a model which determines this profile. The model requires as input the spatial resolution of the BL grid.

Note that the light profile describes the distribution of the light locally. Although the LEDs could be all the same, the light profile changes based upon its spatial position. For example, the reflections at the corners or borders of the screen have a significant (and desired) impact on the local light profile.

Since there are a lot of different backlight designs, the profile for various display panel changes with each model. It is impractical for various reasons to measure the profile for each and every model and utilize that accordingly for each individual model. Therefore, in an example embodiment, the calculate BL profile 108 block of the backlight system 100 uses an algorithm which can calculate the light profile based on input related to the spatial distribution of a single backlight led segment.

Based on the observation that backlight designers will always aim to design the system such that it creates a uniform backlight distribution if all LEDs are active, while not overdesigning it, i.e., extra LEDs or LED segments, which would simply add cost, the profile of a single LED (or grouped together) can be determined. The model is a function, which could be Gaussian-based, in which the width of the profile and degree of spatial light reduction with distance from the LED center is directly related to the spatial resolution or pitch (e.g., distance between two segment centers and can be calculated from the panel size and segment resolution, e.g. 64×36) of the backlight grid. The model would produce the light profile for every location on the screen taking into account the reflections at the borders.

Figure 2:
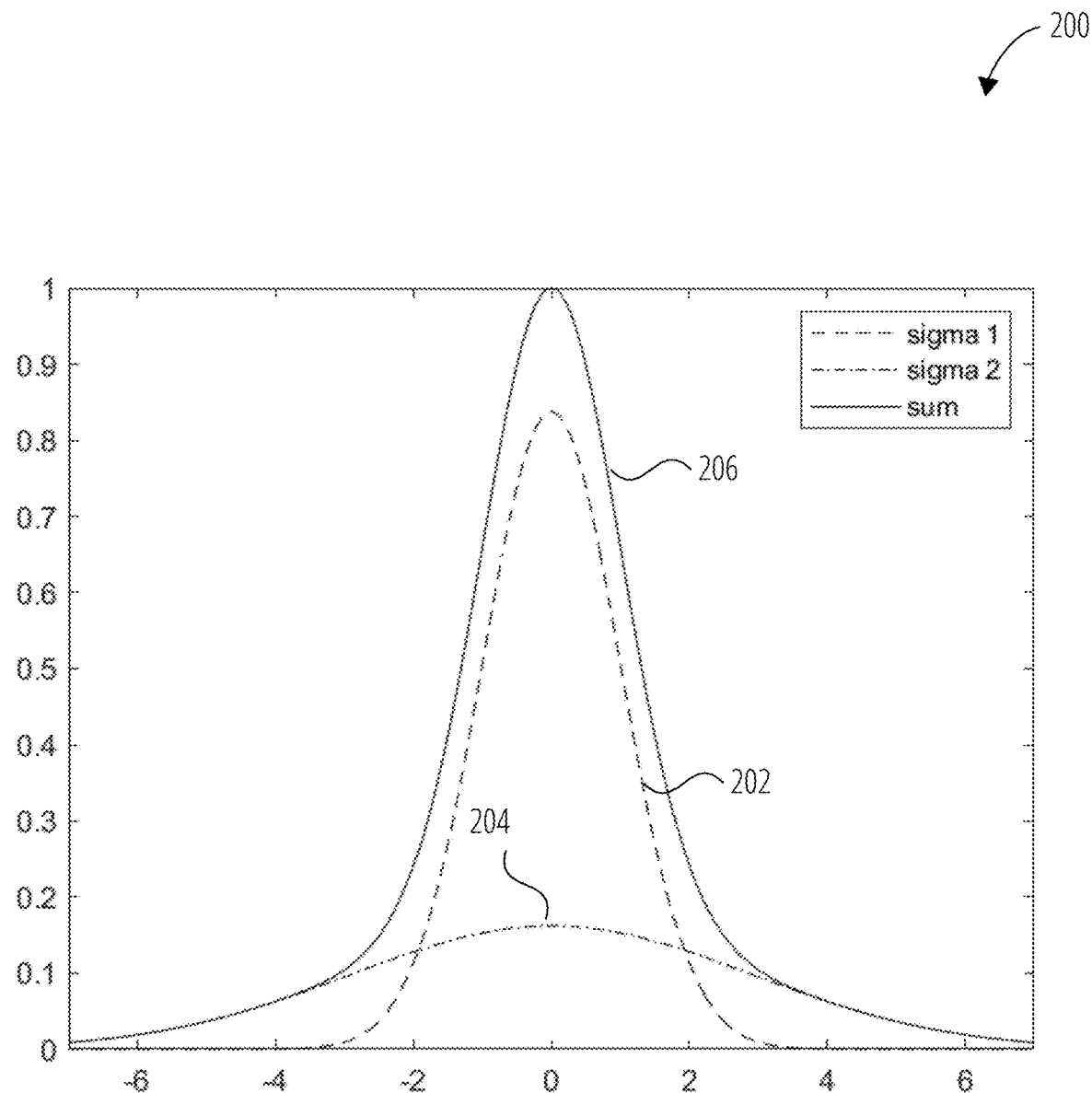
FIG. 2 illustrates a chart of a LED profile in accordance with one embodiment.

FIG. 2 illustrates a chart of LED profiles in accordance with one embodiment. From measurements on sample panels it follows that the profile of the LEDs can e.g. be approximated by the sum of 2 Gaussian curves sigma 1 202 and sigma 2 204. Also, for LEDs close to the edges of the backlight it is a good estimation to assume that the light reflects at these edges.

The drive levels per LED 116 are determined based upon the local required light, the light profile, and the settings of the backlight for the current picture. Note that one LED does not just impact the pixels into a small neighborhood of its spatial position but, in the extreme, it will impact all pixels (to various degrees) on the screen. Therefore there is a significant amount of 'cross talk' between the LEDs, and it is a challenge of the determine BL drive values 110 block (drive calculation unit) to find an optimal balance between the required light for each location and the setting or drive value for each LED. In addition, driving the LEDs with different values spatially and temporally can also lead to (undesired) artefacts in the front of screen visual perception. For example, by turning on one LED for a small local bright object while the other LEDs are switched off (to create an optimal black level) creates a so called 'halo' or glow around the bright object. Another example is that switching off and on the backlight locally can lead to perceived flickering on the screen. Optimally balancing the drive levels between all of this is a challenge.

In addition, for backlight designs which allow boosting, also the current per LED can be determined. A current above the nominal current drives the LED 'harder' and therefore produces more light. However, it usually can only do so for a short period of time and only for a limited amount of LEDs in the backlight.

In an example system the required light is taken as a first estimate for the backlight drive. Then the backlight light output is estimated by using the profile. Because each segment affects neighboring segments, the first estimate has to be corrected. This corrected estimate is then used to drive the pulse width and current of the backlight.

Once the drive (and current) levels are determined, this information is also utilized by the compensate video 112 block (compensator unit), which compensates the video signal based on the local light characteristics. The backlight is estimated once more using the profile. The video is locally adapted (by applying a local gain) for the reduction in local light received.

Figure 3:
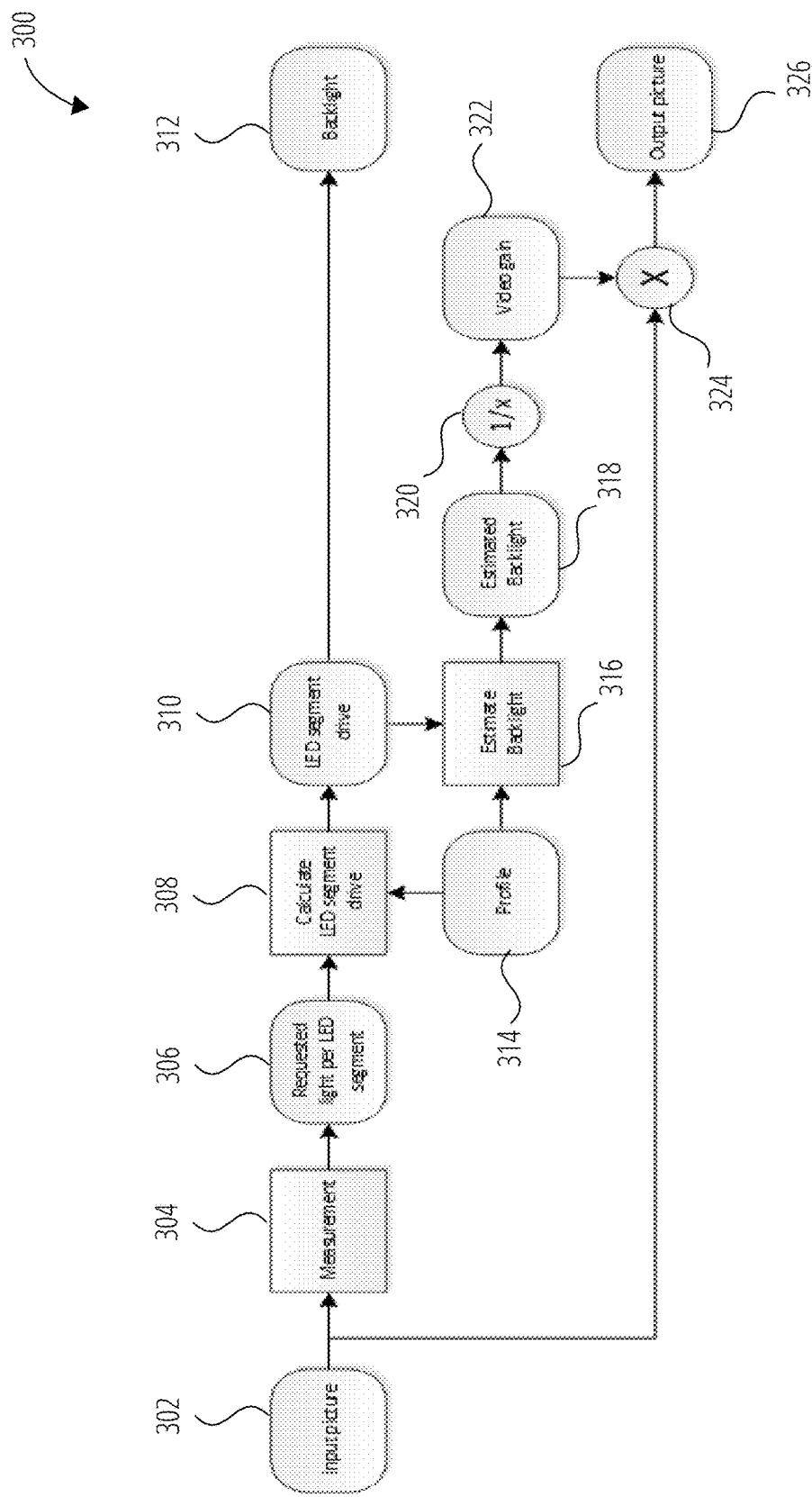
FIG. 3 illustrates a display incorporating the backlight system in accordance with one embodiment.

FIG. 3 illustrates a display 300 in accordance with one embodiment. In the display 300, the video resolution is UHD (3840×2160 pixels, 10 bits) and the backlight resolution is 64×36. The backlight drive levels comprises 64×36 PWM levels (12 bits) and 64×36 current values (8 bits). The output video resolution is the same as the input video resolution.

The backlight profile data is either generated 'on-the-fly' or calculated once at system initiation or system start and then stored in a local or external buffer.

The video compensation applies a gain to the R, G, and B components per pixel which is inversely proportional to the calculated light (compensated for the display gamma) at the position of the current pixel.

In the display 300, an input picture 302 is received by a measurement 304 unit, which calculates requested light per LED segment 306, which used by the calculate LED segment drive 308 block to calculate LED segment drive levels 310, which controls the backlight 312. The profile 314 of the backlight is also used by the calculate LED segment drive 308 block to calculate the LED segment drive 310. An estimate backlight 316 uses the profile 314 and the LED segment drive 310 to derive an estimated backlight 318, the inverse 320 of which is used for a video gain 322 that is applied 324 to the input picture 302 to get an output picture 326. Note that while input picture 302 and output picture 326 are referred to as picture, it can apply to video (e.g., a sequence of pictures).

Figure 4:
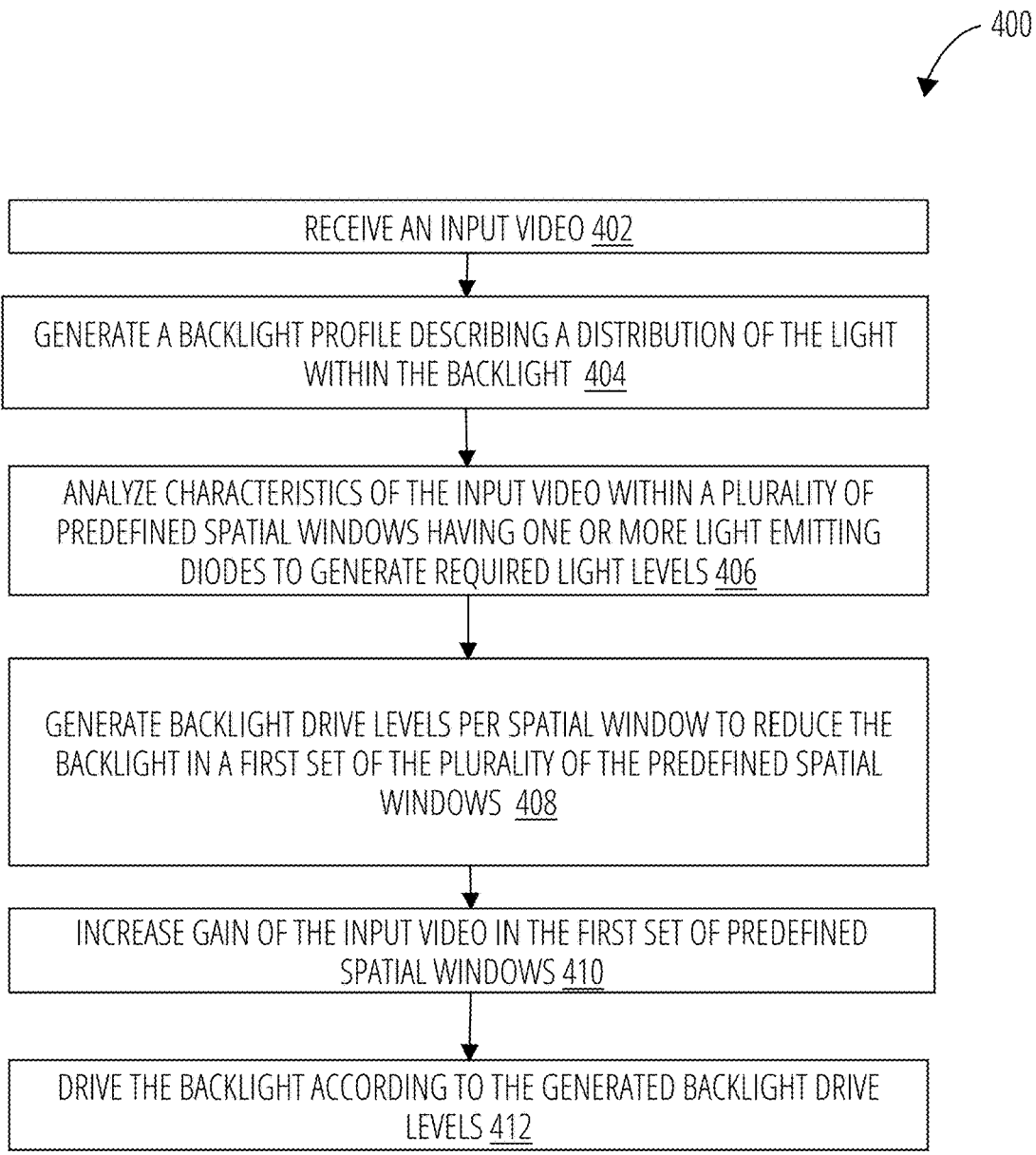
FIG. 4 illustrates a method of operating the backlight system in accordance with one embodiment.

FIG. 4 illustrates a method 400 of operating the backlight system 100 in accordance with one embodiment. In block 402, receive an input video. In block 404, generate a backlight profile describing a distribution of the light of a single LED segment within the backlight. Then generating the backlight drive levels is further based on this backlight profile. In block 406, analyze characteristics of the input video within a plurality of predefined spatial windows having one or more light emitting diodes to generate required light levels. In block 408, generate backlight drive levels per spatial window to reduce the backlight in a first set of the plurality of the predefined spatial windows. In block 410, increase gain of the input video in the first set of predefined spatial windows. In block 412, drive the backlight according to the generated backlight drive levels.

Note that the method 400 can be performed in a different order than listed above and operations listed may not be required.

In view of the disclosure above, various examples are set forth below. It should be noted that one or more features of an example, taken in isolation or combination, should be considered within the disclosure of this application.

1. A method of operating a backlight, comprising:
    receiving an input video;
    analyzing characteristics of the input video within a plurality of predefined spatial windows having one or more light emitting diodes to generate required light levels;
    generating backlight drive levels per spatial window to reduce the backlight in a first set of the plurality of the predefined spatial windows; and
    driving the backlight according to the generated backlight drive levels.
2. The method of example 1, further comprising increasing gain of the input video in the first set of predefined spatial windows.
3. The method of any of the preceding examples, wherein the characteristics include maximum of red, green and blue values.
4. The method of any of the preceding examples, wherein the backlight drive levels include pulse width modulation values per spatial window.
5. The method of any of the preceding examples, further comprising generating a backlight profile describing a distribution of the light of a single segment within the backlight and wherein the generating the backlight drive levels is further based on the backlight profile.
6. The method of any of the preceding examples, wherein the generating backlight profile comprises generating a model using a spatial resolution a backlight grid as input.
7. The method of any of the preceding examples, wherein the model is a function of a width of a profile and degree of spatial light reduction with distance from a center of each light emitting diode and is directly related to the LED segment pitch to produce the backlight profile for every location of the backlight taking into account the reflections at borders of the backlight.

8. The method of any of the preceding examples, wherein the model is Gaussian-based and a profile of light emitting diode is approximated by the sum of two Gaussian curves.

9. The method of any of the preceding examples, wherein the generating backlight drive levels are based on a local required light, the light profile, and settings of the backlight for a current picture.

10. The method of any of the preceding examples, further comprising generating current levels for a second set of a plurality of predefined spatial windows to increase brightness.

11. A backlight system, comprising:
an analyzer configured to receive input video and analyze characteristics of the input video within a plurality of predefined spatial windows having one or more light emitting diodes to generate required light levels;
a backlight drive levels block configured to generate backlight drive levels per spatial window to reduce the backlight in a first set of the plurality of the predefined spatial windows; and
circuitry configured to drive the backlight according to the generated backlight drive levels.

12. The system of example 11, wherein the circuitry is further configured to increase gain of the input video in the first set of predefined spatial windows.

13. The system of any of the preceding examples, wherein the characteristics include maximum of red, green and blue values.

14. The system of any of the preceding examples, wherein the backlight drive levels include pulse width modulation values per spatial window.

15. The system of any of the preceding examples, wherein the backlight drive levels block is further configured to generate a backlight profile describing a distribution of the light of a single segment within the backlight and wherein the generating the backlight drive levels is further based on the backlight profile.

16. The system of any of the preceding examples, wherein the generating backlight profile comprises generating a model using a spatial resolution a backlight grid as input.

17. The system of any of the preceding examples, wherein the model is a function of a width of a profile and degree of spatial light reduction with distance from a center of each light emitting diode and is directly related to the LED segment pitch to produce the backlight profile for every location of the backlight taking into account the reflections at borders of the backlight.

18. The system of any of the preceding examples, wherein the model is Gaussian-based and a profile of light emitting diode is approximated by the sum of two Gaussian curves.

19. The system of any of the preceding examples, wherein the generating backlight drive levels are based on a local required light, the light profile, and settings of the backlight for a current picture.

20. The system of any of the preceding examples, wherein the circuitry is further configured to generate current levels for a second set of a plurality of predefined spatial windows to increase brightness.

Although the subject matter has been described with reference to specific example embodiments, it will be evident that various modifications and changes may be made to these embodiments without departing from the broader scope of the disclosed subject matter.

Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of operating a backlight, comprising:
receiving an input video;
analyzing characteristics of the input video within a plurality of predefined spatial windows having one or more light emitting diodes to generate required light levels;
generating backlight drive levels per spatial window to reduce the backlight in a first set of the plurality of the predefined spatial windows;
driving the backlight according to the generated backlight drive levels; and
generating a backlight profile describing a distribution of the light of a single segment within the backlight and wherein the generating the backlight drive levels is further based on the backlight profile;
wherein the generating backlight profile comprises generating a model that uses a spatial resolution of a backlight grid as input;
wherein the model is a function of a width of a profile and degree of spatial light reduction with distance from a center of each light emitting diode and is directly related to an LED segment pitch to produce the backlight profile for every location of the backlight taking into account reflections at borders of the backlight.

2. The method of claim 1, further comprising increasing gain of the input video in the first set of predefined spatial windows.

3. The method of claim 1, wherein the characteristics include maximum of red, green and blue values.

4. The method of claim 1, wherein the backlight drive levels include pulse width modulation values per spatial window.

5. The method of claim 1, wherein the model is Gaussian-based and a profile of light emitting diode is approximated by the sum of two Gaussian curves.

6. The method of claim 1, wherein the generating backlight drive levels are based on a local required light, the light profile, and settings of the backlight for a current picture.

7. The method of claim 1, further comprising generating current levels for a second set of a plurality of predefined spatial windows to increase brightness.

8. A backlight system, comprising:
- an analyzer configured to receive input video and analyze characteristics of the input video within a plurality of predefined spatial windows having one or more light emitting diodes to generate required light levels; and
- a backlight drive levels block configured to generate backlight drive levels per spatial window to reduce the backlight in a first set of the plurality of the predefined spatial windows; and circuitry configured to drive the backlight according to the generated backlight drive levels;
- wherein the backlight drive levels block is further configured to generate a backlight profile describing a distribution of the light of a single segment within the backlight and wherein the generating the backlight drive levels is further based on the backlight profile;
- wherein the generating backlight profile comprises generating a model that uses a spatial resolution of a backlight grid as input;
- wherein the model is a function of a width of a profile and degree of spatial light reduction with distance from a center of each light emitting diode and is directly related to the spatial resolution of an LED segment pitch to produce the backlight profile for every location of the backlight taking into account reflections at borders of the backlight.

9. The system of claim 8, wherein the circuitry is further configured to increase gain of the input video in the first set of predefined spatial windows.

10. The system of claim 8, wherein the characteristics include maximum of red, green and blue values.

11. The system of claim 8, wherein the backlight drive levels include pulse width modulation values per spatial window.

12. The system of claim 8, wherein the model is Gaussian-based and a profile of light emitting diode is approximated by the sum of two Gaussian curves.

13. The system of claim 8, wherein the generating backlight drive levels are based on a local required light, the light profile, and settings of the backlight for a current picture.

14. The system of claim 8, wherein the circuitry is further configured to generate current levels for a second set of a plurality of predefined spatial windows to increase brightness.

* * * * *